US006792262B2

(12) United States Patent
Yamanaka et al.

(10) Patent No.: US 6,792,262 B2
(45) Date of Patent: Sep. 14, 2004

(54) MOBILE SYSTEM AND MOBILE MANAGEMENT SYSTEM

(75) Inventors: Tadamasa Yamanaka, Saitama (JP); Masahiro Odashima, Saitama (JP); Koji Sakuma, Saitama (JP)

(73) Assignee: Pioneer Corporation, Tokyo (JP)

(*) Notice: Subject to any disclaimer, the term of this patent is extended or adjusted under 35 U.S.C. 154(b) by 565 days.

(21) Appl. No.: 09/816,341

(22) Filed: Mar. 26, 2001

(65) Prior Publication Data

US 2002/0008643 A1 Jan. 24, 2002

(30) Foreign Application Priority Data

Mar. 24, 2000 (JP) .................................... P.2000-084792

(51) Int. Cl.[7] ................................................ H04Q 7/20

(52) U.S. Cl. ................................ 455/404.2; 455/404.1; 455/456.1; 342/357.01; 342/357.07; 340/988; 340/994

(58) Field of Search .......................... 455/67.11, 404.2, 455/407, 456.1, 456.3, 456.6, 457, 404.1, 9, 414.1; 340/988, 991, 992, 993, 994; 342/357.06, 357.07, 357.09, 357.01, 357.1, 357.12

(56) References Cited

U.S. PATENT DOCUMENTS 5,168,451 A * 12/1992 Bolger ...................... 701/117
5,313,200 A * 5/1994 Sone .......................... 340/905
5,548,822 A * 8/1996 Yogo ........................... 455/68
5,618,451 A * 4/1997 Ni ........................ 219/121.53
5,890,682 A * 4/1999 Welk .......................... 246/125
6,009,333 A * 12/1999 Chaco ..................... 455/456.5
6,226,572 B1 * 5/2001 Tojima et al. ................ 701/23
6,243,026 B1 * 6/2001 Jones et al. ................. 340/906
6,295,449 B1 * 9/2001 Westerlage et al. ...... 455/422.1
6,317,058 B1 * 11/2001 Lemelson et al. .......... 340/910

FOREIGN PATENT DOCUMENTS

EP 0 773 524 A1 5/1997

* cited by examiner

*Primary Examiner*—Cong Van Tran
(74) *Attorney, Agent, or Firm*—Sughrue Mion, PLLC

(57) ABSTRACT

In a mobile system and a mobile management system, when an emergency notification that an urgent car 3 is approaching is transmitted from a base station 5 to a general owner-driven car 1, the distance between the general owner-driven car 1 and the urgent car 3 is calculated on the basis of the current position of the general owner-driven car 1 and the current position of the urgent car 3 under the control of a CPU 11. If the distance is within a predetermined value, the base station notifies the driver of the general owner-driven car that the urgent car is approaching.

8 Claims, 4 Drawing Sheets

MOBILE SYSTEM AND MOBILE MANAGEMENT SYSTEM

BACKGROUND OF THE INVENTION

1. Field of the Invention

The present invention relates to a mobile system and a mobile management system which can inform the driver of a mobile unit that an urgent mobile unit is approaching to that mobile unit.

2. Description of the Related Art

Generally, an urgent mobile unit represented by an ambulance car, a fire engine or a patrol car is shifting while announcing that transit of the car to the surrounding people or mobile units by sirening or speaking through microphone.

In recent years, a mobile unit such as an owner-driven car has been improved in the sound insulation, and the residence environment within the mobile unit is more comfortable. On the contrary, it is difficult for the driver to hear outside sounds. Therefore, it is difficult for the driver to hear sirens wailing from an urgent mobile unit while being inside its own mobile unit, it being apprehended that the urgent mobile unit may not be shifted smoothly.

SUMMARY OF THE INVENTION

To solve the above-mentioned problem, it is an object of the present invention to provide a mobile system and a mobile management system which can surely inform the driver of a mobile unit that an urgent mobile unit is approaching to that mobile unit.

In order to accomplish the above-mentioned object, according to a first aspect of the present invention, there is provided a mobile system which is mounted on a mobile unit, comprising position measuring means for measuring the current position of the mobile unit, information transmission means for transmitting the current position measured by the position measuring means to abase station, information reception means for receiving the information that another mobile unit is approaching to the mobile unit from the base station, and control means for controlling the mobile unit to transfer to an emergency state on the basis of the information received by the information reception means.

According to a second aspect of the invention, there is provided the mobile system, wherein the control means controls notification means to notify the driver of the mobile unit of the notice information transmitted from the base station or the notice information memorized in advance.

According to a third aspect of the invention, there is provided the mobile system, further comprising a speaker, wherein the control means reduces the output of sound information which is output from the speaker.

According to a fourth aspect of the invention, there is provided a mobile management system comprising current position receiving means for receiving the current position of a mobile unit from a mobile system which is mounted on the mobile unit, and the current position of another mobile unit from a mobile system which is mounted on another mobile unit different from the mobile unit, and information transmitting means for transmitting the required information to the mobile unit on the basis of the current position of the mobile unit and the current position of another mobile unit which are received by the current position receiving means.

According to a fifth aspect of the invention, there is provided the mobile management system, further comprising selecting means for selecting the mobile unit located within a predetermined distance from another mobile unit, on the basis of the current position of the mobile unit and the current position of another mobile unit which are received by the current position receiving means, wherein the information transmitting means transmits the required information to the mobile unit selected by the selecting means.

According to a sixth aspect of the invention, there is provided the mobile management system, further comprising selecting means for selecting the mobile unit located in a range where another mobile unit can reach within a predetermined time, on the basis of the current position of the mobile unit and the current position of another mobile unit which are received by the current position receiving means, wherein the information providing means provides the required information to the mobile unit selected by the selecting means.

According to a seventh aspect of the invention, there is provided the mobile management system, wherein the required information is the information indicating that another mobile unit is approaching.

DETAILED DESCRIPTION OF THE PREFERRED EMBODIMENTS

The preferred embodiments of the present invention will be detailed below with reference to FIGS. 1 to 4.

In the following embodiments, a mobile management system is considered in which a mobile unit is a general vehicle such as an owner-driven car, and an urgent mobile unit is an urgent car represented by an ambulance car, a fire engine or a patrol car.

Figure 1:
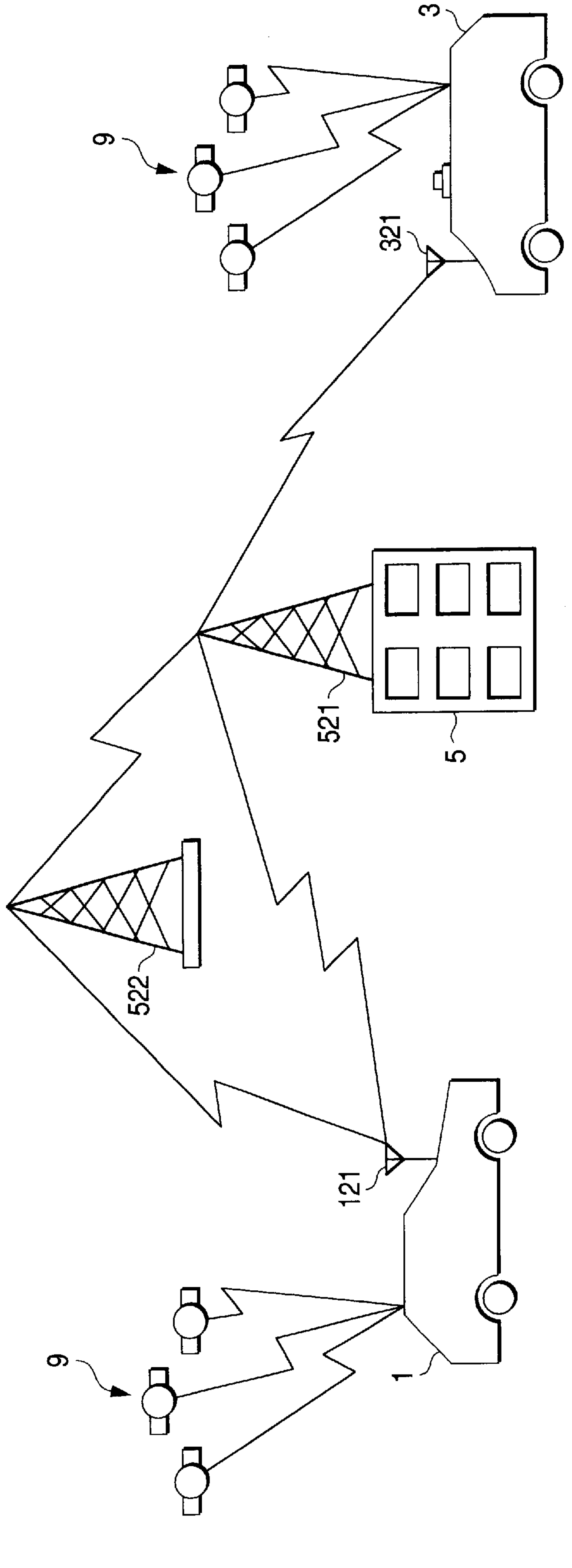
FIG. 1 is a view illustrating schematically a mobile management system according to one embodiment of the present invention.

FIG. 1 shows schematically a mobile management system. Reference numeral 1 denotes a general owner-driven car as one example of the mobile unit. Reference numeral 3 denotes an urgent car as represented by an ambulance car, a fire engine or a patrol car, as one example of the urgent mobile unit. Reference numeral 5 denotes a base station in the mobile management system. The general owner-driven car 1 is provided with an antenna 121, and the urgent car 3 is provided with an antenna 321, thereby enabling various kinds of information to be transmitted or received via an antenna tower 521 placed in the base station 5 or an antenna tower 522 placed in a repeater station.

In FIG. 1, reference numeral 9 denotes a GPS satellite in the GPS (Global Positioning System). These GPS satellites are located on an orbit at an altitude of 20,183 Km from the surface of the earth. The general owner-driven car 1 and the urgent car 3 is mounted with a navigation system making use of this GPS to acquire the current position as the latitude, longitude and altitude information.

Figure 2:
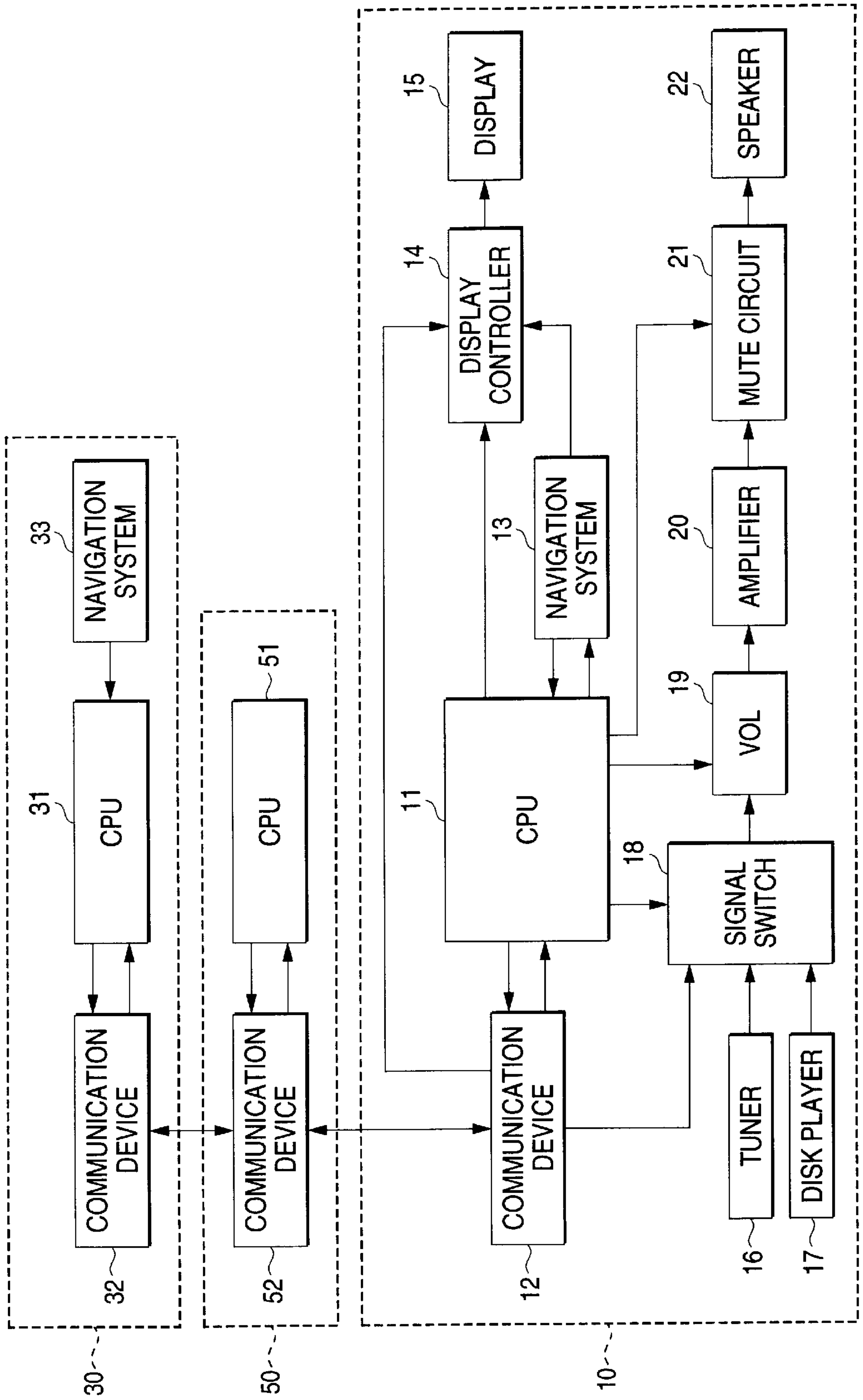
FIG. 2 is a block diagram showing the mobile management system according to one embodiment of the invention.

FIG. 2 is a block diagram showing the details of this mobile management system. The details of the configuration of the mobile management system will be described below with reference to FIG. 2. In FIG. 2, the configuration of the mobile system as indicated by the dashed line 10 is provided on the general owner-driven car 1, the configuration of the mobile system as indicated by the dashed line 30 is provided on the urgent car 3, and the configuration of abase system as indicated by the dashed line 50 is provided on the base station 5.

Firstly, the configuration of the mobile system 10 mounted on the general owner-driven car 1 as indicated by the dashed line 10 will be described below. A CPU 1 as control means is a controller for making the basic control of this entire mobile system 10, and controls each element within the mobile system 10 on the basis of a control program stored in a ROM, not shown.

A communication device 12 has a transmitting and receiving circuit which makes use of a radio communication line, and is information communicating means for communicating the information with the base station 5. This information communicating means uses a cellular telephone unit to transmit or receive the information via a telephone antenna provided on this cellular telephone unit to or from the base station 5. And this communication device 12 receives the current position information, a voice message, and a video message of the urgent car 3 which is transmitted from the base station 5 and outputs that information to the CPU 11. Also, the current position information of the general owner-driven car 1 mounted with this mobile system 10 is input from the CPU 11, and transmitted to the base station 5. The current position information of the general owner-driven car 1 is the positional information measured by current position measuring means provided in the navigation system 13 within the mobile system 10.

The navigation system 13 has the current position measuring means for measuring the current position of the mobile unit and a disk drive for reading the map information from a disk recording medium. The current position measuring means has a GPS receiver for capturing a radio wave from a GPS satellite 9 in the GPS and measuring the current position. Further, the navigation system 13 is equipped with a gyro and a transit distance sensor employed as stand-alone current position measuring means for measuring the current position along with the GPS receiver.

A display controller 14 controls the video information to be input, including a video message or image from the base station 5 which the communication device 12 has received, and a map image output from the navigation system 13, and various kinds of images to be output selectively on a display 15 under the control of the CPU 11.

The mobile system 10 is provided with a tuner 16 and a disk player 17 as an audio source to output various kinds of sound information to a signal switch 18. This signal switch 18 further has the sound information involving a sound message from the base station 5 which the communication device 12 has received, and selectively outputs the sound information to a volume (VOL) 19 under the control of the CPU 11.

The volume (VOL) 19 is operated by the operator of the mobile system 1 such as the driver or fellow passenger of the general owner-driven car 1 to determine the output level of sound information, and further determine it under the control of the CPU 11.

An amplifier 20 amplifies or attenuates the input sound information, on the basis of the output level as determined by the volume (VOL) 19, the sound information being supplied via a mute circuit 21 at latter stage to a speaker 22. This mute circuit is turned on/off by the operator as well as the CPU 11.

The configuration of a mobile system 30 mounted on the urgent car 3 as indicated by the dashed line 30 will be described below. A CPU 31 as control means is a controller for making the basic control of this entire mobile system 30, and controls each element within the mobile system 30 on the basis of a control program stored in a ROM, not shown.

A communication device 32 has a transmitting and receiving circuit which makes use of a radio communication line, and is information communicating means for communicating the information with the base station 5. This information communicating means uses a cellular telephone unit to transmit or receive the information via a telephone antenna provided on this cellular telephone unit to or from the base station 5.

A navigation system 33 has current position measuring means for measuring the current position of the urgent car 3 mounted with this navigation system 33, and a disk drive for reading the map information from a disk recording medium. The navigation system 33, like the navigation system 13 mounted on the general owner-driven car 1 as previously described, is equipped with a gyro and a transit distance sensor as the GPS receiver or the stand-alone current position measuring means.

In the mobile system 30 for the urgent car 3 thus configured, when an emergency task occurs, the current position information measured by the current position measuring means of the navigation system 33 and the emergency information indicating that the state of emergency is entered are transmitted to the base station 5 by the communication device 32, if the operator enters an emergency instruction into the mobile system 30 by means of operation means, not shown.

The configuration of a base system 50 mounted on the base station 5 as indicated by the dashed line 50 will be described below. A CPU 51 as control means is a controller for making the basic control of this entire base system 50, and controls each element within the base system 50 on the basis of a control program stored in a ROM, not shown.

A communication device 52 has a transmitting and receiving circuit which makes use of a radio communication line, and is information communicating means for communicating the information with the general owner-driven car 1 and the urgent car 3. This information communicating means uses a cellular telephone unit to transmit or receive various kinds of information via an antenna tower 521 placed in the base station 5 or an antenna tower 522 placed in a repeater station to or from the general owner-driven car 1 and the urgent car 3.

Figure 3:
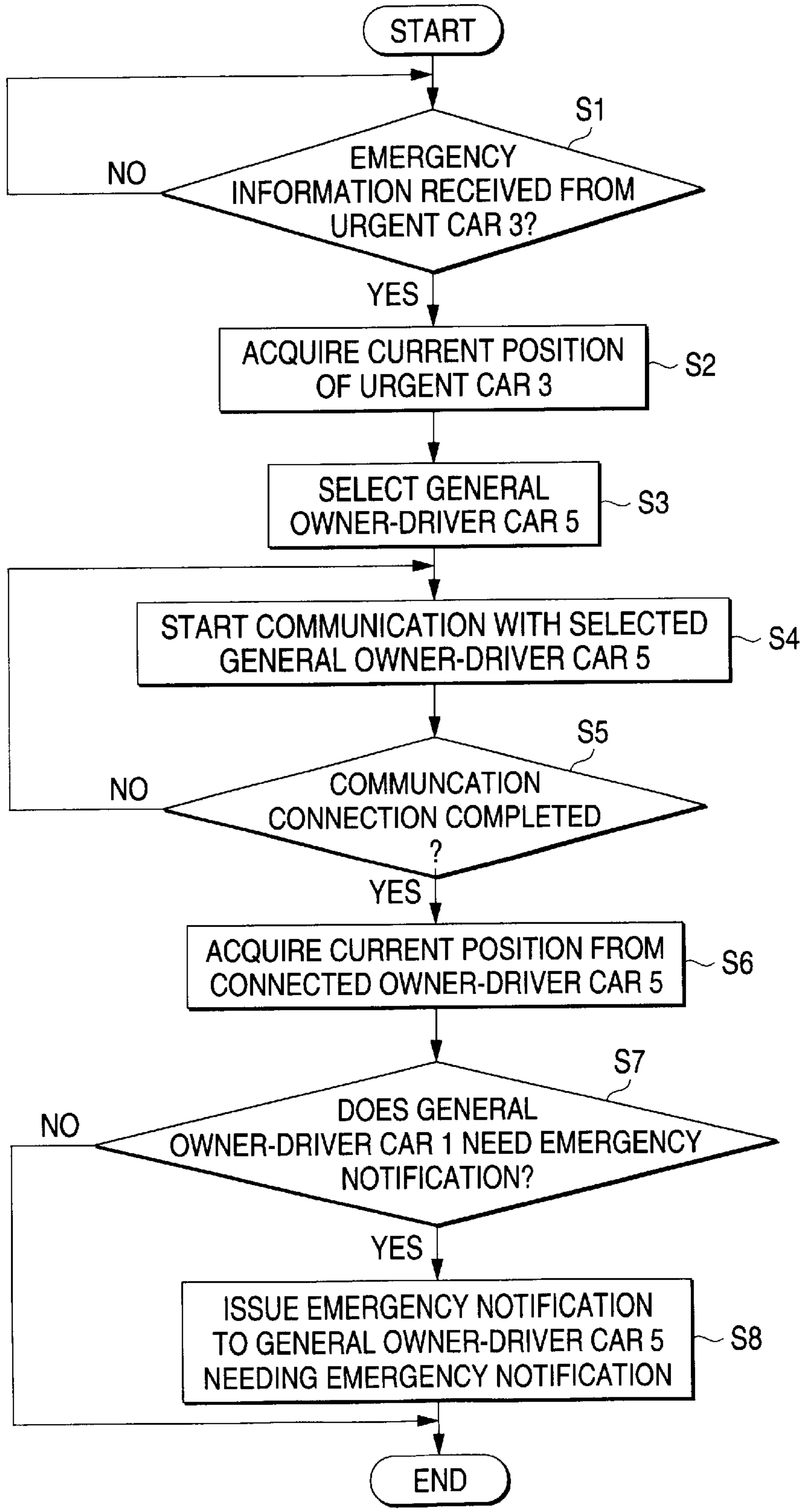
FIG. 3 is a flowchart showing the operation control in a base system according to one embodiment of the invention.
Figure 4:
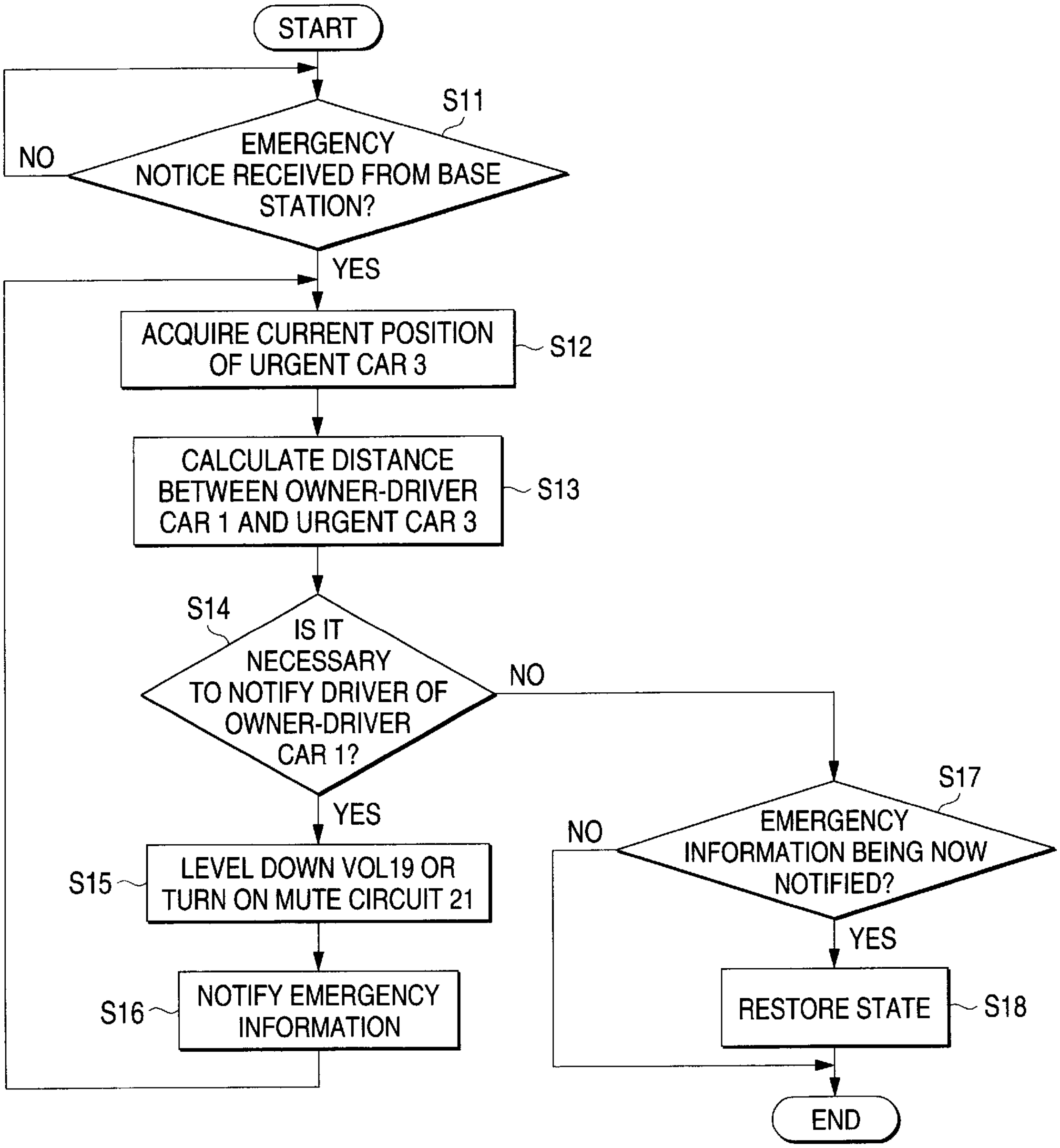
FIG. 4 is a flowchart showing the operation control in a mobile system according to one embodiment of the invention.

The operation of the base system 50 configured in the above way will be described below, using an operation flowchart as shown in FIGS. 3 and 4. FIG. 3 shows a control operation in the base system 50 provided in the base station 5, and FIG. 4 shows a control operation of the mobile system 10 mounted on the general owner-driven car 1.

Referring now to FIG. 3, the control operation of the CPU 51 on the base system 50 provided in the base station 5 will be described below. Firstly, it is determined whether or not the emergency information indicating the entry into a state of emergency to be transmitted from the urgent car 3 is received (step S1). If the emergency information is not received (no), this step S1 is determined again. If the emergency information is received (yes), the current position information of the urgent car 3 which is transmitted from the urgent car 3 is acquired (step S2).

As previously described, in the urgent car 3, when an emergency task occurs, the operator enters an emergency instruction into the mobile system 30 from operation means, not shown, whereby the current position information measured by current position measuring means of the navigation system 33 and the emergency information indicating the entry into the state of emergency are transmitted to the base station 5 by the communication device 32.

Subsequently, the CPU 51 selects the general owner-driven car 1 located with a predetermined distance (e.g., within 500 mm) from the urgent car 3 at that time. This selecting operation will be detailed below. In the base system 50, the current position information transmitted at every predetermined time interval from each general owner-driven car 1 is updated and memorized in correspondence with the identification data of each general owner-driven car 1. Accordingly, the base system 50 can grasp the current positions of a plurality of general owner-driven cars 1.

A comparison is made between the current position information of the urgent car 3 which is transmitted together with the emergency information from the urgent car 3 and the current position information of the general owner-driven car 1 memorized in the base system 50. And the general owner-driven car 1 located within a predetermined distance from the urgent car 3 is selected (step S3).

Then, the base station starts to communicate with one or more general owner-driven cars 1 which are selected (step S4), and it is determined whether or not the communication connection has been established (step S5). If the communication connection has not been established (no), the procedure transfers to step S5 again to attempt to communicate with one or more general owner-driven cars 1 which are selected. On the other hand, if the communication connection has been established (yes), the current position information at the present time is acquired from the general owner-driven car 1 being connected (step S6). And a comparison is made between the current position information of the general owner-driven car 1 at the present time and the current position information of the urgent car 3 which is transmitted from the urgent car 3, whereby it is determined whether or not the general owner-driven car 1 needs an emergency notification (step S7).

This determination is made by comparing between the current position information of the general owner-driven car 1 at the present time and the current position information of the urgent car 3 which is transmitted from the urgent car 3, in the same way as the selecting operation (step S5). It is determined that the general owner-driven car 1 needs an emergency notification, if located within a predetermined distance from the urgent car 3.

If it is determined that the general owner-driven car 1 needs an emergency notification (yes), the emergency notification is issued to the general owner-driven car 1. Or if the general owner-driven car 1 does not need the emergency notification (no), the emergency announcement is not issued to the general owner-driven car 1 and the procedure is ended.

Referring now to FIG. 4, the control operation of the CPU 11 on the mobile system 10 mounted in the general private vehicle 1 will be described below. Firstly, it is determined whether or not an emergency notification to be transmitted from the base station 5 is received (step S11). If the emergency notification is not received (no), this step S11 is determined again. If the emergency notification is received (yes), the current position information of the urgent car 3 which is transmitted from the base station 5 is acquired (step S12).

And the distance between the urgent car 3 and the private car (general owner-driven car 1) is calculated from the current position information of the urgent car 3 which has been acquired and the current position information of the private car (general owner-driven car 1) (step S13). Based on the calculated distance, it is determined whether or not to notify the driver of the private car (general owner-driven car 1) that the urgent car 3 is approaching (step S14). This determination can be made in such a way that the emergency notification is required if the distance between the urgent car 3 and the private car (general owner-driven car 1) is within a predetermined distance, or the emergency notification is not required if it is beyond the predetermined distance.

Herein, if the emergency notification is not required (no), the procedure transfers to the next step S17, where it is determined whether the mobile system 10 is notifying the emergency information at the present time (step S17). If it is determined that the mobile system 10 is not notifying the emergency information (no), this control is ended.

On the other hand, if it is needed to notify that the urgent car 3 is approaching (yes) at step S14, the output level of the VOL 19 is set at a low level to enable the amplifier 20 to attenuate the sound information input from the audio source such as the tuner 16 or disk player 17, thereby reducing the sound information from the speaker 22. Apart from this, the sound information output from the speaker 22 may be inhibited by turning on the mute circuit 21. In any case, since the output level of sound information output from the speaker 22 is automatically reduced, the driver is more likely to hear sirens of the urgent car 3 inside the own car, when the urgent car 3 is approaching.

Then, the character information "Urgent car is approaching" is displayed on the display 15 to notify the driver of an emergency message (step S16). Herein, the emergency message displayed on the display 15 may be a fixed message memorized in the CPU 1. Also, the video message information transmitted from the base station 5 may be received by the communication device 12 and displayed.

The sound information input from the audio source is kept being output from the speaker, as described above. Apart from this, the CPU 11 may control the signal switch 18 to select the sound information input from the communication device, so that an emergency message "Urgent car is approaching" transmitted from the base station 5 can be out put from the speaker, thereby surely notifying the driver that the urgent car 3 is approaching.

The procedure transfers to step S12, where the current position information of the urgent car 3 transmitted from the base station 5 is acquired again (step S12). The distance between the urgent car 3 and the private car (general owner-driven car 1) is calculated from the acquired current position information of the urgent car 3 and the current position information of the private car (general owner-driven car 1). Based on the calculated distance, it is determined whether or not to notify the driver of the private car (general owner-driven car) that the urgent car 3 is approaching (step S14). The above process is repeated.

Herein, because the urgent car 3 is leaving away from the private car (general owner-driven car 1), if the notification is not necessary (no), the procedure transfers to the next step S17 to determine whether or not the mobile system 10 is notifying the emergency information at the present time. If so, the notification is ended, and the state before notification is restored (step S18). Then, this control is ended.

In the embodiment as described above, the control operation of the CPU 51 in the base system 50 of the base station 5, the selecting operation of the general owner-driven car 1 (step S5) and the determination of whether or not the emergency notification is needed (step S7) are performed in such a way as to make a comparison between the current position information of the urgent car 3 and the current position information of the general owner-driven car 1 memorized within the base system 50, selecting the general owner-driven car 1 located within a predetermined distance from the urgent car, and determining that the emergency notification is needed. Besides, the journey between both cars may be calculated, employing the map data memorized within the base system 50, and the general owner-driven car 1 located within a predetermined journey from the urgent car 3 may be selected.

For the control operation of the CPU 11 in the mobile system 10 mounted on the general owner-driven car 1, a determination whether or not to notify the driver of the private car 1 (general owner-driven car 1) (step S14) is based on the distance between the urgent car 3 and the general owner-driven car 1. Besides, the journey between both cars maybe calculated, employing the map data for use with the navigation system 13, and the general owner-driven car 1 located within a predetermined journey from the urgent car 3 may be selected.

Further, for the selection and determination in the control operation of the CPU 51 in the base system 50, as well as the determination in the control operation of the CPU 11 in the mobile system 10, the approaching time between both cars is calculated with the transit speed of the urgent car 3, as well as the distance or journey between both cars, as the parameters, the general owner-driven car 1 with the approaching time (the time for the urgent car 3 to reach the general owner-driven car 1) shorter than a predetermined time is selected. Thereby, the selection can be effected more securely.

In calculating this approaching time, it is desirable to have the traffic snarl information as a parameter. In addition, using the transit scheduled route of the urgent car 3 as a parameter, a comparison is made between the route where the urgent car 3 runs and the route where the general owner-driven car 1 is running, whereby it is possible to select the general owner-driven car 1 which will most possibly approach to the urgent car 3. For example, in the case where the urgent car 3 is running on the up line of the expressway and the general owner-driven car 1 is running on the down line of the same expressway, it is determined that the emergency notification is not transmitted to the general owner-driven car 1 even if both cars are approaching.

In the above embodiments, the vehicle mounted navigation system has been described. However, the configuration and operation of the invention may be also applied to a wide range of mobile units such as a ship or airplane.

In the mobile system mounted on the mobile unit and the mobile management system provided in the base station according to the present invention, it is possible to notify surely the driver of the mobile unit that the urgent car is approaching.

What is claimed is:

1. A mobile system which is mounted on a mobile unit, comprising:

a position measuring section for measuring the current position of said mobile unit;

an information transmission section for transmitting the current position measured by said position measuring section to a base station;

an information reception section for receiving the information that another mobile unit is approaching to said mobile unit from said base station; and a controller for controlling said mobile unit to transfer to an emergency state on the basis of the information received by said information reception section.

2. The mobile system according to claim 1, wherein said controller controls a notification section to notify the driver of said mobile unit of the notice information transmitted from the base station or the notice information memorized in advance.

3. The mobile system according to claim 1, further comprising a speaker, wherein said controller reduces the output of sound information which is output from said speaker.

4. A mobile management system comprising:

a current position receiving section for receiving the current position of a mobile unit from a mobile system which is mounted on said mobile unit, and the current position of another mobile unit from a mobile system which is mounted on said another mobile unit different from said mobile unit; and an information transmitting section for transmitting the required information to said mobile unit on the basis of the current position of said mobile unit and the current position of said another mobile unit which are received by said current position receiving section;

a selector for selecting said mobile unit located within a predetermined distance from said another mobile unit, on the basis of the current position of said mobile unit and the current position of said another mobile unit which are received by said current position receiving section, wherein said information transmitting section transmits the required information to said mobile unit selected by said selector.

5. A mobile management system comprising:

a current position receiving section for receiving the current position of a mobile unit from a mobile system which is mounted on said mobile unit, and the current position of another mobile unit from a mobile system which is mounted on said another mobile unit different from said mobile unit; and an information transmitting section for transmitting the required information to said mobile unit on the basis of the current position of said mobile unit and the current position of said another mobile unit which are received by said current position receiving section, a selector for selecting said mobile unit located in a range where said another mobile unit can reach within a predetermined time, on the basis of the current position of said mobile unit and the current position of said another mobile unit which are received by said current position receiving section, wherein said information providing section provides the required information to said mobile unit selected by said selector.

6. A mobile management system comprising:

a current position receiving section for receiving the current position of a mobile unit from a mobile system which is mounted on said mobile unit, and the current position of another mobile unit from a mobile system which is mounted on said another mobile unit different from said mobile unit; and an information transmitting section for transmitting the required information to said mobile unit on the basis of the current position of said mobile unit and the current position of said another mobile unit which are received by said current position receiving section, wherein said required information is the information indicating that said another mobile unit is approaching.

7. The mobile management system according to claim 4, wherein said required information is the information indicating that said another mobile unit is approaching.

8. The mobile management system according to claim 5, wherein said required information is the information indicating that said another mobile unit is approaching.

* * * * *